United States Patent [19]

Bussiere et al.

[11] Patent Number: 4,919,944

[45] Date of Patent: * Apr. 24, 1990

[54] PROCESS FOR MANUFACTURING SOFT CHEESES

[75] Inventors: Guy Bussiere, Ramonville; Jean Lablee, Mamirolle, both of France

[73] Assignee: Roquette Feres, Lestrem, France

[ * ] Notice: The portion of the term of this patent subsequent to Jul. 25, 2006 has been disclaimed.

[21] Appl. No.: 298,303

[22] Filed: Jan. 18, 1989

Related U.S. Application Data

[63] Continuation of Ser. No. 942,681, Dec. 17, 1986, abandoned.

[30] Foreign Application Priority Data

Dec. 17, 1985 [FR] France ................ 85 18688

[51] Int. Cl.$^5$ .................... A23C 19/05; A23C 19/068
[52] U.S. Cl. ........................ 426/39; 426/40; 426/582
[58] Field of Search ............. 426/34, 36, 37, 38, 426/39, 40, 42, 43, 61, 580, 582, 491, 657

[56] References Cited

U.S. PATENT DOCUMENTS 2,982,654  5/1961  Hammond et al.

4,020,186  4/1977  Edwards .................. 426/39

OTHER PUBLICATIONS

Hicks et al., "Equipment and Procedure of Manuf. Lab. Cheese Curd", J. Dairy Sci., vol. 64, No. 3, 1981, pp. 523-525.

Shebata et al., "Manuf. of Blue Cheese by Direct Acidification Methods", J. Dairy Sci., vol. 49, 1966, pp. 1025-1031.

*Primary Examiner*—Marianne Cintins
*Attorney, Agent, or Firm*—Fleit, Jacobson, Cohn, Price, Holman & Stern

[57] ABSTRACT

In the process of the invention for manufacturing soft cheeses from raw milk, in the course of the phase of preparation of the milk before renneting, an acidiogen selected from the group consisting of gluconolactones and glucoheptonolactones is added to the milk in an amount sufficient to attain simply and reliably, in a predetermined time, the exact predetermined renneting pH comprised between 6.0 and 6.6, preferably between 6.0 and about 6.5. The acidogen is advantageously gluconodeltalactone. The process is applied in the manufacture of soft cheeses with mastery of the acidification phase of the milk.

12 Claims, No Drawings

PROCESS FOR MANUFACTURING SOFT CHEESES

This application is a continuation of application Ser. No. 942,681, filed Dec. 17, 1986, now abandoned.

The invention relates to a novel process for manufacturing soft body cheeses or "soft cheeses".

More precisely, the invention relates to a novel process for manufacturing soft cheeses according to which acidification of the milk before renneting is carried out in a controlled manner by means of an acidogen.

Within the scope of the invention, by soft cheeses is meant, in accordance with the classification given in the work "Le Fromage", coordinated by André ECK, Technique et Documentation (Lavoisier), Paris (1984), especially pages 220–221, in particular flowered or washed crust cheeses whose dry extract is 40 to 50%, such as cheeses of the camembert, carré0 de l'Est, Brie munster, Pont l'Eveque types.

It is recalled that, traditionally, the manufacture of soft cheeses comprises essentially the following steps:

Preparation of the milk

This expression implies the possible heat processing operation of the raw milk and the maturation operation by the action of lactic ferments which result in acidification of the milk to a pH value corresponding to the requirements needed for the subsequent renneting step, generally comprised between 6.0 and about 6.5.

Renneting

The matured milk is supplemented with coagulating enzymes.

Coagulation

The characteristics of the coagulum are strictly dependent on the kinectics of coagulation. Among the four basic parameters governing this physico-chemical reaction, which are: the coagulating enzymes, soluble calcium, temperature and acidification, the acidification generated by the fermenting activity must develop gradually throughout the whole duration of the coagulation and draining phases.

cutting up-grinding moulding-draining taking from the mould-salting

At this stage, the cheese must have reached a pH value comprised between 4.5 and 5.4, this value being connected with the type of soft cheese manufactured.

ripening

This is the ultimate step of manufacturing soft cheeses which consists of preserving the cheese under controlled conditions of temperature and humidity, in order to facilitate the development of the microorganisms, particularly mould fungi of the Penicillium camemberti type, which act on the organoleptic properties (texture and flavour) whilst permitting a controlled enzymatic action.

By convention, in the following, the set of steps comprised between coagulation and ripening will be designated "forming step".

For a long time, the man skilled in the art has sought to optimize and industrialize the processes of manufacturing cheeses, and particularly soft cheeses.

More precisely, numerous works have concerned the phase relating to the preparation of the milk. Thus it is preferred today to process the raw milk thermally for the destruction of its common flora in order to improve the bacteriological quality of the milk and to increase its preservability. This technique is now widely used in workshops of large capacity, when the use of the raw milk is rather reserved for workshops of more modest dimensions and for the manufacture of types of cheeses which have, for reasons of appellation of origin, imperavitely to be prepared from raw milk.

It remains nonetheless undeniable that the presence of lactic ferments is indispensable in cheese-making techniques. In fact, these lactic ferments play an essential part in the phase of acidification of the milk leading to the formation of the coagulum and in the acidification phase of the curd until the end of draining, as well as in the development of the organoleptic properties of the finished product.

In the case of the raw milk, the ordinary lactic flora, naturally present in the milk traditionally ensured the acidification, without excluding the possibility of reinforcing its action by a complementary addition of lactic ferment cultures.

In the case of milk processed thermally, it is necessary to acidify it particularly by seeding with lactic ferment cultures, by suitable techniques.

To carry out this acidification, different variants are proposed at the present time.

In a first variant, the most traditional, the phase of preparation of the milk comprises, besides the thermal treatment and the standardization of the composition in fats and proteins, a maturation step of which the acidification kinetics is directly a function of the amount of lactic leavens added. This addition of lactic ferments must be moderate, in order to tend towards mastering this fermentation and to be able to carry out the renetting at the required pH.

This maturation time is very variable since the rhythms of receiving the milk at the factory and the rhythms of employment are very discordant, whence "waiting time" (buffer storage time) varying from some hours to some tens of hours.

In addition the renneting pH must be fully respected, according to the type of soft cheese manufactured. Also, taking into account an almost exponential growth phase of the lactic flora, the pH decreases too rapidly, rendering extremely delicate the determination of the moment at which the addition of the coagulating enzymes must be done (renneting).

In addition, the maturation being carried out for economical and practical reasons in vats or "tanks" of very large capacity, on taking up the milk for renneting the content of each "tank" is distributed between several renneting vats of distinctly less capacity, whence between the first and the last vat filled and renneted, different maturation times, hence different renneting pH's. These reasons enable the difficulties encountered in the mechanization of these operations, to be well understood.

To overcome these drawbacks, another variant has been proposed. It comprises, after the usual operations of receiving the milk and the first heat treatment, a first maturation phase, accelerated or not, by the addition of a larger or smaller dose of lactic ferments. The mastery of the pH is achieved by a second thermal treatment selected so as to destroy either partly, or almost entirely the lactic flora; the subsequent continuation of the acidification is effected by the residual fraction of lactic ferments in the first hypothesis, or by a further addition of lactic ferments in the second hypothesis.

This second thermal treatment proves to be a laborious additional operation and especially very delicate to the extent that, in the vicinity of the renneting pH, the casein of the milk has become more unstable and more sensitive to temperature, whence a risk of "gratination" (deposition of residues of the walls of the heat exchangers). This drawback can be limited by carrying out this thermal treatment at a pH higher than 6.3, taking care to have an equipment ensuring a $\Delta T$ (difference in temperature between the hot wall and the cold wall) which is minimal.

Now, it is well known to the man skilled in the art that the pH on renneting conditions coagulation and the subsequent operations, as well as the characteristics of the finished product. The existence of this threshold at a pH in the vicinity of 6.3 therefore limits the technological possibilities of manufacturing soft cheeses.

There is therefore an interest which is certain in the development of a novel process making possible the removal of the above-described drawbacks, inherent in the operation of preparation of the milk for the manufacture of soft cheeses.

Applicants have developed a novel process of manufacturing soft cheeses enabling the step of preparation of the milk to be mastered, thus facilitating the automatisation of production lines, and this without the organoleptic properties of the finished products being disadvantageously altered.

This novel process of manufacturing soft cheeses is characterized by the fact that the milk is acidified in a controlled manner, particularly from its initial pH value on reception, comprised customarily between 6.6 and 6.8, to a pH value comprised between 6.0 and 6.6, preferably between 6.0 and about 6.5, by means of an acidogen.

Applicants have in fact observed that, surprisingly the use of an acidogen enabled relatively low pH's before renneting to be attained simply and reliably, and this in a predetermined time and without unfavorably affecting the subsequent steps in the manufacture of the soft cheese and the organoleptic characters of the products obtained.

The milk, raw material serving for the manufacture of soft cheeses according to the present invention, may be any milk or mixture of milks of any origin, in particular those customarily employed in the manufacture of soft cheeses according to the prior art.

By acidogen, is meant here any substance neutral from the point of view of pH and capable, after solubilization in an aqueous medium, of being progressively converted into an acid.

Among the substances of this type, appear certain acid anhydrides, lactids and particularly those with a low melting point of lactic acid, lactones such as gluconolactones and glucoheptonolactones, and similar substances and/or their mixtures.

These definitions being given, the invention relates to a process for the manufacturing of soft cheeses comprising the successive steps of preparation of the milk, renneting, coagulation, forming and ripening, characterized by the fact that in the course of the phase of preparation of the milk, the latter is acidified in a controlled manner to a pH value comprised between 6.0 and 6.6, preferably between 6.0 and about 6.5, by means of an acidogen.

It is well known that the kinetics of conversion of an acidogen into an acid is strictly dependent on the temperature of the aqueous medium in which it is solubilized. Consequently, from the three basic parameters of the milk used in the cheese making industry which are:
the initial pH of the milk,
the pH required for renneting,
the temperature of the milk,
the technician can determine with accuracy the dose of acidogen to be incorporated and the time required to reach the desired renneting pH, knowing with certainty the hydrolysis kinetics of the acidogen.

This improvement brought about by the addition of acidogen at the time of maturation leads therefore to a perfect and total mastery of the preparation phase of the milk, thus improving the automatisation conditions of production lines for soft cheeses.

This addition of acidogen can be effected indifferently in the form of a powder or in the form of a solution.

In the case where the acidogen is added in powder form, its dispersion in the milk and its solubilization are ensured by any suitable stirring means.

In the case where it is preferred to add this acidogen in the form of a solution, the latter is advantageously prepared at the moment of use, in order to limit, as much as can be, the hydrolysis of the acidogen. In fact if, through this hydrolysis, the solution of acidogen showed too great an acidity, the well-known drawbacks connected with the direct use of acids in the industrial production of soft cheeses will again appear.

In practice, and taking into account the particularities associated with each production line for soft cheeses, the technician, knowing the hydrolysis kinetics of the acidogen employed, will determine the best moment to introduce it.

By way of indication, the acidogen could be introduced:
into the raw milk, or
into the milk after possible thermal treatment.

It is of course understood that other variants could be envisaged.

In all cases, it is convenient, to determine the moment at which the acidogen must be introduced, to take into account its hydrolysis kinetics at the temperature of the milk at the moment of the introduction and up to renneting.

In certain cases, it is preferred to choose a dose of acidogen such that, after complete hydrolysis of this agent, the milk is at the required pH for renneting. In other cases, this dose could be higher, so that the hydrolysis of the acidogen at the predetermined pH for renneting is incomplete, thus promoting the subsequent acidification of the renneted milk.

Thus a suitable dose of acidogen can enable mastery of the acidification in the course of the manufacturing steps which follow renneting, particularly by ensuring a reproducible drop in pH from renneting to coagulation and then at least until cutting with grinding.

This controlled acidification on renneting and in the course of the steps which follow renneting is advantageously practiced when the ferments employed for the subsequent acidification of the curd have a long latent period, particularly in the case of the use of ferments for the direct seeding of the milk, used in frozen or lyophilized form.

In the same way, Applicants have observed that the controlled acidification on renneting and in the course of the steps which follow renneting, would permit, under certain conditions, a reduction in manufacturing times.

Besides the technical advantages associated with the mastery of the pH during the maturation and through this fact in the improvement of the possibilities of automating the production lines of soft cheeses, Applicant company has, as has been stated above, established the fact that the replacement of the lactic ferments by an acidogen in the maturation phase of the milk was, unexpectedly, without significant incidence on the characteristics of texture and of taste of the ripened soft cheeses.

The process according to the invention does not involve however for all that, the elimination of lactic ferments or of any other ferment. It is, in fact, possible to introduce lactic ferments or any other microorganism in the course of the employment of the process according to the invention in an amount and at a moment which will be a function of the desired technological or qualitative objectives sought such as, for example, particular organoleptic characters.

Thus, lactic ferments could be introduced at the level of maturation, but it would then be necessary for their amount to be sufficiently low not to influence significantly the kinetics of reducing the pH, in order not to re-encounter the drawbacks of the prior art. On the other hand, the amount of lactic ferments could be greater if they are added at the time of renneting.

The invention enabling the elimination of the need of thermal treatment in the course or at the end of maturation of the milk, renders possible the lowering of the pH on renneting to a value below 6.3, which permits on the one hand a wider range of variation at the level of texture and taste of the ripened soft cheeses and, on the other hand, a reduction of the dose of coagulating enzymes, which is economically advantageous.

The acidogens preferably used within the scope of the invention are gluconolactones and glucoheptonolactones, more preferably gluconolactones and particularly gluconodeltalactone (GDL).

Besides the aforesaid advantages, the excellent solubility in aqueous media of GDL and its hydrolysis kinetics at the temperatures traditionally encountered on the maturation of the milk for the manufacture of soft cheeses, make it perfectly adapted to the particular requirements in the manufacture of these cheeses. Moreover Applicant Company has observed that, surprisingly, gluconic acid is practically no more to be found in the finished product.

Advantageously, the amount of acidogen employed within the scope of the invention is from 2 to 2000 g/hl of milk, preferably, it is comprised between 5 and 1000 g/hl of milk and, more preferably, between 10 and 500 g/hl of milk, according to the acidogen used.

Thus, in the particular case where the acidogen is GDL, the amount employed is advantageously from 5 to 500 g/hl of milk, preferably, it is comprised between 10 and 300 g/hl of milk and, more preferably, between 20 and 200 g/hl of milk.

The invention will be better understood by means of the examples which follow and which comprise the description of advantageous embodiments. All these examples have been carried out by I.T.I.L. on the premises of the École Nationale d'Industrie Laitiére of Mamirolle-Besancon (France).

Examoles of the manufacture of soft cheeses of the "carré de l'Est" type.

EXAMPLE 1 - Control

From the production at the farm until the end of the preparation, the milk is subjected to the customary industrial conditions of the premises where this test is carried out, namely: received on the day before in the morning, the milk is kept in a "holding" tank at 6° C. until the following morning; it then undergoes the following preparation treatment.

2000 l of milk are prepared under normal industrial conditions: standardization in composition to 34 g/l of fat by mixing 200 l of skimmed milk and 1800 l of whole milk, these two fractions successively undergoing a thermal treatment on a plate heat exchanger at 78° C. for 40 seconds with an outflow temperature of 36° C. In industrial practice, the skimmed milk fraction is prepared first: the whole milk undergoes a first heating to 50° C. in the plate heat exchanger, then it passes into the skimmer; the skimmed milk then comes back into the exchanger where it undergoes the end of the thermal cycle: 78° C. for 40 seconds then cooling to 36° C. 200 l of this heat treated skimmed milk are led into the maturation tank and left for about one hour at 36° C.

The thermal treatment of the whole milk is then carried out and 1800 l of this milk at 36° C. are mixed with the 200 l of skimmed milk. In this way, 2000 l of standardized and heat-treated milk are obtained.

The pH of the milk is measured on the whole milk fraction at the moment of its introduction at 36° C. into the fermentation tank. It is 6.56±0.02.

An addition of soluble calcium salt is then made in the proportion of 200 ml of a solution comprising 520 g/l of calcium chloride.

The maturation is then carried out, first by an addition of penicillium camemberti mould spores: in practice, 15 standard doses of lyophilised preparation coming, for example, from the LACTO-LABO Company B.P. 10-23, rue du Collège - 86220 Dange-Saint-Romain, France) or from the G. ROGER Laboratories (4, rue de la Gare -B.P. 20-77260 La Ferté-sous-Jouarre, France are mixed with the skimmed milk.

Then, an addition of mesophilic lactic ferments is made. A concentrated and frozen preparation marketed by MILES Laboratories — Division Marshall (rue des Longs Réages —28230 Epernon, France), is cultivated in Marstar nutrient medium, marketed by the same MILES Laboratories, applying strictly the conditions of preparation recommended by said Laboratories. 0.8% of this culture (expressed by volume with respect to the 2000 l of milk) namely 16 l is then mixed with the milk according to the following practical modalities:

A first half of the preparation is introduced into the skimmed milk as soon as it is brought into the maturation tank; the second half is introduced into the standardized milk; the time between this introduction and the obtaining of the maturation pH aimed at about 6.5 is variable between 15 and 30 minutes.

At the end of maturation, the characteristics of the milk are as follows:
pH=6.49±0.02;
temperature: 35° C.

At this stage, the 2000 l of matured milk are divided into 20 basins of 100 l each, which basins then undergo successively the following operations.

The renneting of each basin of 100 l is ensured by the addition of 0.22 ml/l of milk of a commercial preparation of coagulating enzymes containing 520 mg of chymosin per liter. In cheese-making practice, for a constant setting time as defined below, the amount of enzyme varies as a function of the pH of the milk at this stage, namely the lower the pH, the less the amount of enzyme.

The setting time, that is to say the time between the instant when the coagulating enzymes are added and that when it is observed by manual examination that coagulation is beginning, is 16.5 minutes in the case of this test. The milk is allowed to coagulate further, according to traditional conditions, for a time double that of setting, namely 33 minutes.

The coagulum is cut up in its basin into cubes of about 2 cm side by means of a wire apparatus. The pH is then 6.35±0.02. The extraction of the whey is then accelerated by three successive manual grindings spaced by 6 minutes. As a result of which, the curd considerably reduced in volume is found at the bottom of the basin, covered by a considerable volume of whey.

After removal of about 30 l of the supernatant whey, the whole of the curd is distributed into 48 square moulds of 10 cm side.

The draining is carried out in a place at 25° C., the moulds being subjected to turning over four times: immediately after moulding, after 15 minutes, 3 hours and 8 hours.

The cheeses are taken from the moulds after 20 hours. Their pH is 4.83±0.02.

Brinning enables the proportions of salt (sodium chloride) of the cheeses to be adjusted by soaking for 1 h 15 minutes in the usual brine at 12° C., of density 1.180, namely 276 g of salt per liter of solution.

Drying and surface seeding: having emerged from the brine and drained, the cheeses are seeded at the surface by spraying a suspension of Penicillium camemberti spores, obtained from the same lyophilized trade preparations as above, namely 25 commercial doses are dispersed in 1.5 l of water at ambient temperature, this amount serving for seeding of the whole of the production coming from the 2000 l of milk employed (48 cheeses).

Ripening: the cheeses are placed in the cheese ripening room air conditioned at 13° C., with a relative humidity of 85-90%; 8 to 9 days after manufacture, the development of the Penicillium flora is very easily seen at the surface. The cheeses are then wrapped in the marketing wrapping materials. They remain for a further 10 days at this temperature to complete their ripening.

The values of the essential parameters noted in the course of manufacture as well as the evaluations of the cheeses obtained are reported in column 1 of the table which follows.

EXAMPLE 2

A volume of 50 l of milk is taken from a volume of 2000 l standardized in fats and heat-treated as in example 1.

This volume at a temperature of 36° C. receives the same proportions of soluble calcium and of the lyophilised penicillium camemberti preparation, as in example 1. On the other hand, the lactic ferments are not incorporated during the preparation but they are replaced by 0.8 g of gluconodeltalactone marketed by the ROQUETTE FRERES Company, per liter of milk (80 g/hl), namely 40 g introduced in crystalline form then solubilized by manual stirring.

After 10 minutes of maturation, the pH of the milk is 6.41±0.02.

The renneting is ensured by 0.18 ml/l of milk of the same commercial preparation of coagulating enzymes as that used in example 1. At the same time an addition is made of 0.5% (expressed as volume with respect to the milk) of the same preparation as that of example 1, of lactic ferments cultivated on a nutrient medium.

All the other stages of the manufacture are strictly identical with those of example 1, except that the operation is carried out on an amount of 50 l instead of 100 l of each basin of example 1. The values of the principal parameters are reported in column 2 of the table.

EXAMPLE 3

It is strictly identical with example 2, except that the maturation time is brought from 10 to 35 minutes so as to obtain an almost total hydrolysis of the GDL.

The proportion of coagulating enzymes having remained at the same value of 0.18 ml/l whilst the pH is distinctly less explains that the setting time is distinctly less than the normal (10.5 minutes).

The values of the principal parameters relating to this example are reported in column 3 of the table.

EXAMPLE 4

It is carried out under strictly identical conditions with those of example 3, with the following exceptions:

the proportion of GDL is brought back from 80 g/hl of milk to 50 g/hl so that the pH is stabilized at the moment of renneting to the value as close as possible to that of example 1, the maturation time is brought to 40 minutes for safety, so as to have a perfectly stabilized pH, the concentration of the coagulating enzyme preparation is 0.22 ml/l of milk, namely the same value as in example 1.

The values of the principal parameters relating to this example are reported in column 4 of the table.

EXAMPLE 5

It is strictly identical with example 2, except that the concentration of GDL is doubled, namely 160 g/hl of milk, that the proportion of coagulating enzyme preparation is lowered to 0.16 ml/l by reason of the low value of the pH on renneting and that the proportion of lactic ferment preparation added upon renneting is brought back from 0.5% to 0.4%.

EXAMPLE 6

The manufacture employs the same amount of milk as for example 1, namely 2000 l.

On the day before in the evening, 1800 l of whole milk are placed at 6° C. in a storage tank. 400 g of crystalline GDL marketed by the ROQUETTE FRERES Company are then introduced and solubilized with stirring.

The following morning, the standardization and thermal treatment are carried out similarly to those of example 1, namely that from a normal milk (without GDL) preserved since the day before, a skimming and heat treatment are carried out and 200 l of this skimmed milk are taken and introduced at 36° C. into the maturation tank.

The previous day's milk in which the GDL is solubilized undergoes the same heat-treatment and is brought to 36° C. in the maturation tank. In this way, 2000 l of milk comprising 20 g/hl of GDL are obtained.

As in example 1, the milk is adjusted in soluble calcium and seeded with penicillium camemberti spores.

The pH is then 6.48±0.02. The renneting is then carried out with a concentration of 0.22 ml/l of milk of coagulating enzyme preparation, and at the same time is added 0.8% (expressed by volume with respect to the milk) of the same lactic ferment preparation as in example 1, cultivated on a nutrient medium.

The remainder of the operations is identical with that of example 1.

The values of the principal parameters relating to this test are reported in column 6 of the table.

The manufactures corresponding to examples 1 to 5 were carried out over a period of five days, which was judged acceptable for comparative tasting of the ripened cheeses. This explains that the cheeses of example 5 had been judged by the tasting panel as insufficiently ripened. The tasting results are reported in the table.

The cheese according to example 6 could not be compared with the preceding ones since it was manufactured at a later date; however, it could be tasted in comparison with the daily industrial manufactures (identical with example 1) carried out at almost the same date.

neting pH for the type of soft cheese being manufactured;
acidifying the milk for renneting solely by adding an acidogen to the milk, said acidogen being selected from the group consisting of gluconolactones and glucoheptonolactones and said acidogen being added to the milk in an amount which is the minimum amount required to bring the initial pH of the milk to the renneting pH within the selected period of time, said minimum amount of acidogen being determined based on the kinetics of transformation of the acidogen at said temperature of the milk and as a function of the volume of the milk and the selected period of time, whereby the milk is acidified for renneting and brought from the initial pH to the renneting pH solely by the acidogen;
renneting the prepared milk by adding coagulating enzymes to the prepared milk; and then
coagulating;
forming; and
ripening.

2. A process of claim 1, further comprising the step of adding lactic ferments to the milk prior to renneting, said lactic ferments being adding for organoleptic and textural proposes only and being added at a time and in an amount such that the lactic ferments do not influence acidification for obtaining the renneting pH of the milk by acidogen.

3. A process according to claim 1, wherein the exact predetermined renneting pH is between 6.0 and about 6.5.

TABLE

| | Tests of soft cheeses: carres de l'Est | | | | | |
|---|---|---|---|---|---|---|
| CHARACTERISTICS | Example 1 Control | Example 2 | Example 3 | Example 4 Renneting pH same control | Example 5 High dose of GDL | Example 6 GDL at start of preparation |
| Lactic ferment prep. (at maturation) (%) | 0.8 | — | — | — | — | — |
| GDL (g/hl) | — | 80 | 80 | 50 | 160 | 20 |
| pH milk after thermal treatment (±0.02) | 6.56 | 6.55 | 6.58 | 6.56 | 6.55 | 6.55 |
| Time and temperature of maturation | ~20 min. 35° C. | 10 min. 35° C. | 35 min. 35° C. | 40 min. 35° C. | 10 min. 35° C. | ≃13 h, 6° C. |
| Renneting pH (±0.02) | 6.49 | 6.41 | 6.30 | 6.51 | 6.20 | 6.48 |
| Proportion of coagulating prep. (ml/l) | 0.22 | 0.18 | 0.18 | 0.22 | 0.16 | 0.22 |
| Lactic ferment prep. (renneting) (%) | — | 0.5 | 0.5 | 0.5 | 0.4 | 0.8 |
| Setting time (min.) | 16.5 | 15 | 10.5 | 16 | 15.5 | 13 |
| Cutting-up pH (±0,02) | 6.35 | 6.32 | 6.30 | 6.41 | 6.10 | 6.30 |
| pH of cheese on taking from the mould (±0,02) | 4.83 | 4.82 | 4.84 | 4.97 | 4.80 | 4.82 |
| EVALUATIONS AFTER RIPENING — Crust | normal | normal | fluid under crust | slightly fluid under crust | tendency to run under crust | normal |
| Paste | ripened at core, fondant | well-ripened supple | well-ripened supple | well-ripened correct | lack of ripening | well-ripened supple |
| Taste | normal | normal | normal | normal typical taste | normal | normal |

We claim:

1. A process for manufacturing soft cheeses from milk wherein the milk is acidified in a reproducible and reliable manner for renneting, comprising the steps of:
providing a given volume of milk from which the soft cheese is to be prepared; p1 measuring the initial pH and the temperature of said milk;
selecting a period of time within which the pH of the milk will be brought from the initial pH to a renneting pH, said renneting pH being between 6.0 and 6.6 and said renneting pH being the required renneting pH for the type of soft cheese being manufactured;

4. A process according to claim 1, wherein the acidogen is introduced into a raw milk.

5. A process according to claim 1, wherein the acidogen is introduced into a raw milk having undergone a heat treatment.

6. A process according to claim 1, wherein the amount of acidogen employed is from 2 to 2000 g/hl of milk.

7. A process according to claim 6, wherein the amount of acidogen employed is between 5 and 1000 g/hl of milk.

8. A process according to claim 7, wherein the amount of acidogen employed is between 10 and 500 g/hl of milk.

9. A process according to claim 1, wherein the acidogen is gluconodeltalactone (GDL).

10. A process according to claim 9, wherein the amount of GDL employed is from 5 to 500 g/hl of milk.

11. A process according to claim 10, wherein the amount of GDL employed is between 10 and 300 g/hl of milk.

12. A process according to claim 11, wherein the amount of GDL employed is between 20 and 200 g/hl of milk.

* * * * *